UNITED STATES PATENT OFFICE 2,647,134

SELECTIVE REDUCTION OF 3-KETO GROUP OF POLYKETOSTEROIDS

John A. Hogg, Douglas A. Lyttle, and Alan H. Nathan, Kalamazoo, Mich., assignors to The Upjohn Company, Kalamazoo, Mich., a corporation of Michigan No Drawing. Application August 31, 1951, Serial No. 244,744

14 Claims. (Cl. 260—397.4)

This invention relates to the selective reduction of a carbonyl group at carbon atom 3 in a steroid molecule which contains other reducible oxygen functions. More particularly it pertains to the reduction of 3-ketopregnanes of the formula:

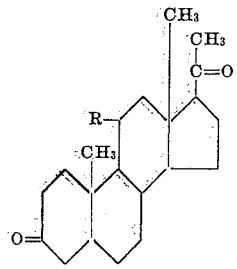

wherein R is a member of the group consisting of hydrogen, hydroxyl, acyloxy and carbonyl, to 3-hydroxypregnanes of the formula:

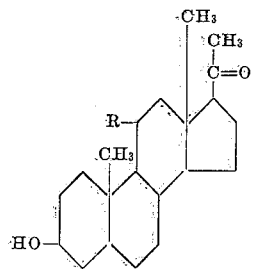

wherein R has the above designated values, by treatment of the 3-ketopregnane with a metal borohydride.

The invention affords a simple and effective means of converting a carbonyl group at $C_3$ in a steroid molecule of the type mentioned above to a hydroxyl group. Confinement of the reduction to the carbonyl group at $C_3$ is controlled most conveniently by limiting the amount of borohydride employed, although temperature and duration of the reaction can also be used as controlling factors.

The reduction permits considerable latitude in the selection and range of operating conditions. Concentrations of the steroid and the borohydride can vary from stoichiometric amounts of each to an excess of the borohydride ranging up to 300 percent (4 equivalents). However, when a large excess of borohydride is used, the duration of the reaction and/or the temperature should be decreased in order to prevent reduction of carbonyl groups at positions other than at $C_3$. Thus only the $C_3$ carbonyl group was reduced when 3,11,20-triketopregnane was treated with four equivalents of borohydride for two minutes at fifteen degrees centigrade in dioxane-water. Likewise only the $C_3$ carbonyl group was reduced when 3,11,20-triketopregnane was treated with two equivalents (100 percent excess of the amount required for the reduction of one carbonyl group) of borohydride for thirty minutes at 25 degrees centigrade in isopropanol-water. However, the reaction of 11α-acetoxy-3,20-diketopregnane with 4.4 equivalents (340 percent excess of the amount required for the reduction of one carbonyl group) of borohydride in aqueous methanol for one hour at the boiling point gave reduction at both the $C_3$ and $C_{20}$ carbonyl groups. Therefore, in order to minimize the possibility of reduction of other carbonyl groups in addition to that at $C_3$, the preferred amount of borohydride is from about 1 to about 1.25 equivalents (based on the amount required for the reduction of one carbonyl group).

The period during which the steroid is subjected to the action of the borohydride can vary from about two minutes to about two hours, depending upon the relative concentrations of the two reactants and the temperature at which the reduction is conducted. Periods longer than two hours do not appear to be necessary.

Temperatures can range from the boiling point of the solvent to well below room temperature providing the solvent does not freeze or the steroid separate from solution. A convenient and preferred range is from about twenty degrees centigrade to about fifty degrees centigrade.

Among the solvents which can be used for the reaction are methanol, ethanol, isopropanol, dioxane, tetrahydrofuran and the like. These can be used in the anhydrous state or admixed with a small amount of water. A preferred solvent is a mixture of isopropanol and water. The steroid is dissolved in isopropanol and to this solution is added sodium borohydride dissolved in a volume of water amounting to about 5–10 percent of the volume of isopropanol.

The borohydride does not need to be 100 percent pure. Sodium borohydride having a purity of 83–88 percent and lithium borohydride having a purity of 55 percent were used in this invention and compensatingly larger amounts were employed.

The configuration of the $C_3$ hydroxyl group in the product of the reduction was stereochemically opposite to that of the $C_5$ hydrogen. Thus, the reduction of a pregnane of the normal series in which the configuration of the hydrogen at $C_5$ is β gave a 3 α hydroxyl group, while the reduction of a pregnane of the allo series in which the configuration of the hydrogen at $C_5$ is $\alpha$ gave a 3 $\beta$ hydroxyl group.

The following examples will illustrate in greater detail the practice of this invention.

PREPARATION 1.—11α-HYDROXYPROGESTERONE

One milliliter of a sterile physiological saline suspension of spores (conidia) of culture RH 176 (*Rhizopus arrhizus* strain), ATCC 11145, from a ten milliliter malt agar-Edamine solid medium slant (five days old) was used to inoculate a sterile 150 milliliter medium of two percent Edamine (a preparation of Sheffield Farms consisting of mixed amino acids including peptides from the enzymatic hydrolysis of lactalbumin), 5 percent dextrose, 0.5 percent corn steep liquor, and tap water. This 150 milliliter culture was agitated and aerated by shaking for 24 hours to promote heavy vegetative growth. One hundred milliliters of this vegetative growth was transferred to four liters of sterile medium which was aerated and agitated for 24 hours by shaking. To this was added four grams of progesterone in forty milliliters of methanol and aeration was continued. After 24 hours and 45 minutes the medium was extracted successively with one 2-liter portion and two 1-liter portions of methylene chloride. The extracts were combined and washed twice with 500 milliliter portions of two percent aqueous sodium bicarbonate solution and twice with 500 milliliter portions of water. The methylene chloride extract was evaporated to dryness under reduced pressure to yield 4.38 grams of residue. The residue was dissolved in 150 milliliters of benzene and chromatographed over 200 grams of acid-washed alumina which had been dried at 120 degrees centigrade. The column was developed with 400-milliliter portions of solvents; results are shown in the following table:

| Fraction number | Solvent | Weight of residue in milligrams |
|---|---|---|
| 1 | Benzene |  |
| 2 | ....do.... |  |
| 3 | Benzene+5% ether |  |
| 4 | ....do.... |  |
| 5 | Benzene+10% ether | 13 |
| 6 | ....do.... | 30 |
| 7 | Benzene+50% ether | 57 |
| 8 | ....do.... | 4 |
| 9 | Ether | 0 |
| 10 | ....do.... | 0 |
| 11 | Ether+5% chloroform | 0 |
| 12 | ....do.... | 0 |
| 13 | Ether+10% chloroform | 9 |
| 14 | ....do.... | 188 |
| 15 | Ether+50% chloroform | 311 |
| 16 | ....do.... | 195 |
| 17 | ....do.... | 58 |
| 18 | ....do.... | 9 |
| 19 | Chloroform | 3 |
| 20 | ....do.... | 910 |
| 21 | ....do.... | 902 |
| 22 | ....do.... | 182 |
| 23 | Chloroform+5% acetone | 64 |
| 24 | Acetone | 130 |
| 25 | Methanol | 243 |

The results obtained are summarized in the following table:

| Fractions | Composition | Wt. (grams) |
|---|---|---|
| Benzene insoluble | Dihydroxyprogesterone | 0.635 |
| 14–16 | Progesterone | 0.694 |
| 20–22 | 11α-Hydroxyprogesterone | 1.994 |
| 23–25 | Tailings (Mono and dihydroxy compounds) | 0.437 |

The 11α-hydroxyprogesterone fraction was dissolved in fifteen milliliters of warm methanol, two milliliters of water were added, and the mixture was filtered. After standing in the refrigerator overnight 1.15 grams (29 percent) was obtained of crystalline 11α-hydroxyprogesterone which melted at 163–166 degrees centigrade. A small second crop of crystalline product was also obtained.

PREPARATION 2.—PREGNANE-11α-OL-3,20-DIONE (11α-HYDROXY-3,20-DIKETOPREGNANE) AND ALLOPREGNANE-11α-OL-3,20-DIONE (11α-HYDROXY-3,20-DIKETOALLOPREGNANE)

A solution of 250 milligrams (0.75 millimole) of 11α-hydroxyprogesterone in 100 milliliters of ethanol containing six drops of triethylamine was subjected to hydrogenation at room temperature under a pressure of about ten pounds of hydrogen in the presence of 45 milligrams of a 30 percent palladium-charcoal catalyst in a Parr apparatus with an auxiliary mercury manometer. The time required for the hydrogenation was about twenty minutes. The reaction mixture was filtered and the solvent was evaporated to yield 265 milligrams of material melting at 145–185 degrees centigrade. This product was extracted with a mixture of one milliliter of ether and nine milliliters of Skellysolve-B (petroleum ether, boiling range 60–70 degrees centigrade). On standing, the extract deposited eighty milligrams (32 percent) of pregnane-11α-ol-3,20-dione as feathery needles which melted at 85–90 degrees centigrade. Recrystallization from a mixture of about six drops of ethyl acetate and five milliliters of Skellysolve-B did not change the melting point.

*Anal.*—Calcd. for $C_{21}H_{32}O_3$: C, 75.86; H, 9.70. Found: C, 76.13; H, 9.63.

The residue from the above extraction weighed 146 milligrams (58 percent) and melted at 165–185 degrees centigrade. Recrystallization from ethyl acetate gave 85 milligrams (34 percent) of allopregnane-11α-ol-3,20-dione melting at 193–196 degrees centigrade with softening at about 190 degrees. A purified sample melted at 198.5–199.5 degrees centigrade.

*Anal.*—Calcd. for $C_{21}H_{32}O_3$: C, 75.86; H, 9.70. Found: C, 75.59; H, 9.98.

The separation of the normal and allo pregnanes was also accomplished by chromatography. An intimate mixture of 16.7 grams of Celite S-545 and 8.3 grams of Darco G-60 was wet packed with about 150 milliliters of methanol into a column three centimeters wide. (The ratio of fifty grams of adsorbent to one gram of the reaction product, as used here, was satisfactory in cases where the normal form predominated. When the allo form was the major component or when the composition of the mixture was not known, a ratio of 100:1 was used.) About two pounds of air pressure was applied until the liquid had dropped to the level of the adsorbent. A plug of cotton was packed on top of the adsorbent and the column was washed with one 200-milliliter fraction of methanol and two 200-milliliter fractions of acetone. The reaction mixture from the hydrogenation in methanol of 500 milligrams of 11α-hydroxyprogesterone was dissolved in 200 milliliters of acetone and added to the column. This fraction, after passing through the column, was termed the first eluate fraction. It was followed by eight 200-milliliter fractions of acetone and four 200-milliliter fractions of methylene chloride. (For the elutions about eight milliliters of solvent per gram of adsorbent was satisfactory.) Each new fraction was added when the level of the preceding one reached the cotton plug. The pregnane-11α-ol-3,20-dione was usually obtained by evaporation of fractions 2–6 while the allopregnane-11α-ol-3,20-dione was obtained by evaporation of fractions 10–12. Following are the results of a typical separation:

| Fraction No. | Solvent | Wt. in milligrams |
|---|---|---|
| 1 | Acetone | 0 |
| 2 | do | 132 |
| 3 | do | 113 |
| 4 | do | 43 | Normal 323 mg., 64%.
| 5 | do | 22 |
| 6 | do | 13 |
| 7 | do | 9 |
| 8 | do | 7 |
| 9 | do | 5 |
| 10 | Methylene chloride | 64 | Allo 123 mg., 24%.
| 11 | do | 44 |
| 12 | do | 15 |
| 13 | do | 7 |

A 0.55 gram sample of the normal form as obtained above was dissolved in ten milliliters of acetone, twenty milliliters of warm water was added, and the solution was allowed to cool gradually at room temperature and finally was placed in a refrigerator. Crystallization occurred and 0.38 gram (69 percent recovery) of pregnane-11α-ol-3,20-dione was obtained which melted at 55–70 degrees centigrade. The melting point of the normal form was extremely variable, ranging from that given above to 115–120 degrees centigrade. The variability in melting point did not affect the utility of the various batches as the same results were obtained when these batches were employed in further operations.

PREPARATION 3.—11α-ACETOXYPREGNANE-3,20-DIONE (11α-ACETOXY-3,20-DIKETOPREGNANE)

A mixture of 70.5 milligrams (0.212 millimole) of pregnane-11α-ol-3,20-dione melting at 90–105 degrees centigrade, 0.8 milliliter of acetic anhydride and 0.7 milliliter of pyridine was allowed to stand overnight at room temperature before pouring into ice water to precipitate the product which was isolated by filtration. The yield of 11α - acetoxy - pregnane - 3,20 - dione melting at 143.5–146.5 degrees centigrade was 67 milligrams (84 percent). After one recrystallization from ether-Skellysolve-B the melting point was 150–151 degrees centigrade;

$[\alpha]_D^{23} = +63$ degrees (c=0.803 in chloroform).

Anal.—Calcd. for $C_{23}H_{34}O_4$: C, 73.76; H, 9.15. Found: C, 73.93; H, 9.32.

In the same manner, starting with the appropriate acid, acid chloride or acid anhydride instead of acetic anhydride, the 11α-formyloxy, 11α-propionoxy, 11α-butyroyloxy, 11α-valeroyloxy, 11α-hexanoyloxy, 11α-heptanoyloxy, 11α-octanoyloxy, 11α-benzoyloxy, 11α-phenylacetoxy, 11α-succinoyloxy, 11α-cyclopentylpropionoxy and like 11α-acyloxpregnane-3,20-diones are prepared.

PREPARATION 4.—11α - ACETOXYALLOPREGNANE - 3,20- DIONE (11α-ACETOXY-3,20-DIKETOALLOPREGNANE)

A mixture of 2.95 grams (0.0888 mole) of allopregnane-11α-ol-3,20-dione melting at 191–194 degrees centigrade, 29.2 milliliters of acetic anhydride and 29.2 milliliters of pyridine was allowed to stand overnight at room temperature before pouring into ice water to precipitate the product which was isolated by filtration. The yield of crude 11α-acetoxyallopregnane-3,20-dione melting at 170–175 degrees centigrade was 3.363 grams. Recrystallization from twenty milliliters of ethyl acetate raised the melting point to 180–181 degrees centigrade;

$[\alpha]_D^{23} = +67$ degrees (c=0.477 in chloroform)

Anal.—Calcd. for $C_{23}H_{34}O_4$: C, 73.76; H, 9.15. Found: C, 74.09; H, 9.34.

In the same manner, starting with the appropriate acid, acid chloride or acid anhydride instead of acetic anhydride, the 11α-formyloxy, 11α-propionoxy, 11α-butyroyloxy, 11α-valeroyloxy, 11α-hexanoyloxy, 11α-heptanoyloxy, 11α-octanoyloxy, 11α-benzoyloxy, 11α-phenylacetoxy, 11α-succinoyloxy, 11α-cyclopentylpropionoxy and like 11α-acyloxyallopregnane-3,20-diones are prepared.

Example 1.—Allopregnane-3β-ol-20-one (3β-hydroxy-20-ketoallopregnane)

To a stirred solution of 198.5 milligrams (0.628 millimole) of allopregnane-3,20-dione (3,20-diketoallopregnane) in thirty milliliters of absolute ethanol (which had been distilled from sodium borohydride) at fifty degrees centigrade was added 7.1 milligrams (0.157 millimole based on pure reagent) of sodium borohydride (assay 83.5 percent). The reaction mixture was maintained at fifty degrees centigrade for five minutes, heated to boiling and maintained at the boiling point for one minute; the total time required for the reaction was ten minutes. About 65–70 milliliters of hot water was added to the reaction mixture and the product began to separate. The mixture was allowed to cool slowly to room temperature and finally was chilled in a refrigerator for two hours. The crystalline allopregnane-3β-ol-20-one was collected by filtration, washed with cold thirty percent alcohol and dried; the yield of product melting at 176–183 degrees centigrade was 181 milligrams (91 percent);

$[\alpha]_D^{24} = +94$ degrees (alcohol)

Recrystallization of 77.4 milligrams from acetone raised the melting point to 184–189 degrees centigrade; recovery, 54.1 milligrams (70 percent).

Reduction of allopregnane-3,20-dione in dioxane solution at fifty degrees centigrade for thirty minutes gave like results.

Example 2.—Pregnane-3α,11α-diol-20-one (3α,11α-dihydroxy-20-ketopregnane)

To a solution of 5.31 grams (16.0 millimoles) of pregnane-11α-ol-3,20-dione (Preparation 2) in 130 milliliters of peroxide-free dioxane maintained at fifty degrees centigrade in a water bath was added a solution of 195.5 milligrams (4.33 millimoles based on pure reagent) of sodium borohydride (assay 84 percent) in five milliliters of water. The mixture was stirred for one hour at fifty degrees centigrade, filtered, acidified with 3 N hydrochloric acid and evaporated under reduced pressure. The residue was crystallized from fifty milliliters of ethyl acetate to give 1.95 grams (36 percent) of pregnane-3α,11α-diol-20-one which melted at 180–182 degrees centigrade. An additional 0.2 gram melting at 181–183 degrees centigrade was obtained from the filtrate; total yield, 2.15 grams (40 percent).

Example 3.—Allopregnane-3β,11α-diol-20-one (3β,11α-dihydroxy-20-ketoallopregnane)

To a solution of 250 milligrams (0.753 millimole) of allopregnane-11α-ol-3,20-dione (Preparation 2) in fifteen milliliters of absolute ethanol was added at room temperature a suspension of 8.8 milligrams (0.194 millimole based on pure reagent) of sodium borohydride (assay 83.6 percent) in 2.5 milliliters of ethanol. After standing for fifteen minutes, the mixture was warmed on a steam bath for fifteen minutes, five milliliters of water and one drop of acetic acid were added and the mixture was evaporated to dryness on a steam bath. The residue was crystallized from benzene to yield 164 milligrams (65 percent) of allopregnane-3β,11α-diol-20-one which melted at 169–173 degrees centigrade with softening at 165 degrees. Recrystallization from two milliliters of ethyl acetate and 0.2 milliliter of methylcyclohexane gave small transparent prisms melting at 174–176 degrees centigrade; $[\alpha]_D^{23} = +73$ degrees (c, 1.5037 in ethanol).

*Example 4.—11α-acetoxypregnane-3α-ol-20-one (3α-hydroxy-11α-acetoxy-20-ketopregnane)*

To a solution of 200 milligrams (0.534 millimole) of 11α-acetoxy-pregnane-3,20-dione (Preparation 3) in ten milliliters of peroxide-free dioxane at fifty degrees centigrade was added dropwise with stirring a solution of 6.9 milligrams (0.152 millimole based on pure reagent) of sodium borohydride (assay 83.5 percent) in one milliliter of water. The mixture was stirred at fifty degrees centigrade for one hour and acidified by pouring into fifty milliliters of water containing hydrochloric acid. The oil which first separated crystallized on standing. The solid was collected, washed with water and dried under reduced pressure at fifty degrees centigrade. The yield of 11α-acetoxypregnane-3α-ol-20-one melting at 122–136 degrees centigrade was 156 milligrams.

The crude product was dissolved in fifteen milliliters of benzene and chromatographed over 7.5 grams of acid-washed alumina which had been dried at 120 degrees centigrade. The column was developed with two 15-milliliter portions of each of the following seventeen solvents: benzene, benzene and 5, 10 and 50 percent ether, ether, ether and 5, 10 and 50 percent chloroform, chloroform, chloroform and 5, 10 and 50 percent acetone, acetone and 5, 10 and 50 percent methanol, and methanol. The product appeared from fraction 12 (ether and 5 percent chloroform) thru fraction 22 (chloroform and 10 percent acetone). Combination of these fractions and recrystallization from ethyl acetate-Skellysolve B gave 93 milligrams of product melting at 140–143 degrees centigrade. Two further recrystallizations from isopropyl ether gave pure 11α-acetoxypregnane-3α-ol-20-one melting at 146–148 degrees centigrade.

*Anal.*—Calcd. for $C_{23}H_{36}O_4$: C, 73.4; H, 9.64. Found: C, 73.8; H, 9.61.

In the same manner, starting with the appropriate 11α-acyloxy-pregnane-3,20-dione, the following 11α-acyloxypregnane-3α-ol-20-ones are prepared: 11α-formyloxypregnane-3α-ol-20-one, 11α-propionoxypregnane-3α-ol-20-one, 11α-butyroyloxypregnane-3α-ol-20-one, 11α-valeroyloxypregnane-3α-ol-20-one, 11α-hexanoyloxypregnane-3α-ol-20-one, 11α-heptanoyloxypregnane-3α-ol-20-one, 11α-octanoyloxypregnane-3α-ol-20-one, 11α-benzoyloxypregnane-3α-ol-20-one, 11α-phenylacetoxypregnane-3α-ol-20-one, 11α-succinoyloxypregnane-3α-ol-20-one, 11α-cyclopentylpropionoxypregnane-3α-ol-20-one, and like 11α-acyloxpregnane-3α-ol-20-ones.

*Example 5.—11α-acetoxyallopregnane-3β-ol-20-one (3β-hydroxy-11α-acetoxy-20-ketoallopregnane)*

To a solution of 500 milligrams (1.33 millimoles) of 11α-acetoxyallopregnane-3,20-dione (Preparation 4) in fifteen milliliters of peroxide-free dioxane was added a solution of sixteen milligrams (0.350 millimole based on pure reagent) of sodium borohydride (assay 83 percent) in 0.5 milliliter of water. The mixture was warmed to fifty degrees centigrade, maintained at that temperature for about eighty minutes and treated with two drops of glacial acetic acid. The mixture was then heated on a steam bath and water was added until a faint turbidity was present. On cooling, 433 milligrams (86.4 percent) of 11α-acetoxyallopregnane-3β-ol-20-one separated as colorless prisms which melted at 171–174 degrees centigrade. Concentration of the filtrate yielded an additional fifty milligrams which melted at about 150–160 degrees centigrade. Recrystallization of the first crop from a mixture of ten parts of ethyl acetate and fifteen parts of Skellysolve-B raised the melting point to 179–180.5 degrees centigrade.

*Anal.*—Calcd. for $C_{23}H_{36}O_4$: C, 73.4; H, 9.64. Found: C, 72.89; H, 9.54.

In the same manner, starting with the appropriate 11α-acyloxyallopregnane-3,20-dione, the following 11α-acyloxyallopregnane-3β-ol-20-ones are prepared: 11α-formyloxyallopregnane-3β-ol-20-one, 11α-propionoxyallopregnane-3β-ol-20-one, 11α-butyroyloxyallopregnane-3β-ol-20-one, 11α-valeroyloxyallopregnane-3β-ol-20-one, 11α-hexanoyloxyallopregnane-3β-ol-20-one, 11α-heptanoyloxyallopregnane-3β-ol-20-one, 11α-octanoyloxyallopregnane-3β-ol-20-one, 11α-benzoyloxyallopregnane-3β-ol-20-one, 11α-phenylacetoxyallopregnane-3β-ol-20-one, 11α-succinoyloxyallopregnane-3β-ol-20-one, 11α-cyclopentylpropionoxyallopregnane-3β-ol-20-one, and like 11α-acyloxyallopregnane-3β-ol-20-ones.

*Example 6.—Pregnane-3α-ol-11,20-dione (3α-hydroxy-11,20-diketopregnane)*

A solution of 1.085 grams (3.29 millimoles) of pregnane-3,11,20-trione in 35 milliliters of dioxane (freshly distilled from sodium borohydride) was cooled to thirteen degrees centigrade and to it was added as rapidly as possible with vigorous stirring a solution of 39.8 milligrams (0.927 millimole based on pure reagent) of sodium borohydride (assay 88.2 percent) in 3.5 milliliters of water. The reaction mixture was stirred for thirty minutes at fifteen degrees centigrade and acidified by the addition of three milliliters of glacial acetic acid. Water was added and the mixture was extracted three times with ether. The extracts were combined, washed with water, dried over magnesium sulfate and the solvent was removed. Twice benzene was added to the residue and removed by distillation to remove the dioxane. The residual oil crystallized when it was dissolved in ether and the ether was removed on a steam bath. Removal of last traces of ether under reduced pressure and recrystallization of the crude product from acetone and Skellysolve-B gave 795 milligrams (73 percent) of pregnane-3α-ol-11,20-dione melting at 169.5–172.5 degrees centigrade. A second recrystallization gave 675 milligrams (63 percent) melting at 173.5–174.5 degrees centigrade.

Reduction of pregnane-3,11,20-trione in isopropyl alcohol gave like results.

Example 7.—Allopregnane-3β-ol-11,20-dione (3β-hydroxy-11,20-diketoallopregnane)

A solution of 3.4 grams (10.3 millimoles) of allopregnane-3,11,20-trione in 750 milliliters of ethanol was treated dropwise with stirring during thirty minutes with a solution of 125 milligrams (2.75 millimoles based on pure reagent) of sodium borohydride (assay 83.5 percent) in 100 milliliters ethanol. As the addition proceeded, the temperature was slowly raised to sixty degrees centigrade. When the addition was completed, the reaction mixture was heated under reflux for fifteen minutes, treated with fifty milliliters of water while still warm, stirred about fifteen minutes and concentrated to a volume of about 100 milliliters under reduced pressure. An additional 200 milliliters of water was added and the mixture was extracted four times with ether. After drying the combined extracts, removal of the ether left a glassy residue which, when triturated with 25 milliliters of hot Skellysolve-B, gave a white granular solid. Recrystallization from ten milliliters of acetone and five milliliters of water gave 1.71 grams (50 percent) of allopregnane-3β-ol-11,20-dione as slender needles melting at 180–184 degrees centigrade. An additional ten percent was obtained from the mother liquors. Acetylation of the product gave the acetate, melting point 129–131 degrees centigrade, which was hydrolyzed to regenerate a purer sample of allopregnane-3β-ol-11,20-dione melting at 188–190 degrees centigrade; $[\alpha]_D^{25} = +99.3$ degrees (chloroform)

Anal.—Calcd. for $C_{21}H_{32}O_3$: C, 75.86; H, 9.70. Found: C, 75.84; H, 9.85.

Example 8.—Pregnane-3α-ol-11,20-dione (3α-hydroxy-11,20-diketopregnane) by the use of lithium borohydride A solution of 0.867 grams (2.63 millimoles) of pregnane-3,11,20-trione in twenty milliliters of tetrahydrofuran (freshly distilled from sodium borohydride) was cooled in ice water and to it was added rapidly with vigorous stirring a solution of 26.0 milligrams (0.655 millimole based on pure reagent) of lithium borohydride (assay 55 percent) in twelve milliliters of water. The reaction mixture was stirred for fifteen minutes at zero degrees centigrade and acidified by the addition of glacial acetic acid. Solvents were removed under reduced pressure and the residue was dissolved in the minimum amount of hot isopropanol. To this solution hot water was added until a faint turbidity was present and isopropanol was added dropwise until the turbidity was discharged. The mixture was seeded and allowed to cool slowly to room temperature. After two hours, the crystalline product which had separated was collected by filtration, washed thoroughly with dilute isopropanol and dried. Recrystallization from ethyl acetate-Skellysolve B gave 546.5 milligrams (63 percent) of pregnane-3α-ol-11,20-dione melting at 177.5–179 degrees centigrade. A second crop of 66 milligrams melting at 170–172 degrees centigrade was obtained from the mother liquors; the total yield was 612.5 milligrams (70.6 percent).

Example 9.—Pregnane-3α,11α,20-triol (3α,11α,20-trihydroxypregnane)

To a methanolic solution (125 milliliters) of a mixture of the normal (predominant) and allo forms of 11α-acetoxypregnane-3,20-dione, obtained from the hydrogenation of 3.745 grams (10.05 millimoles) of 11α-acetoxyprogesterone in the presence of a palladium-group II metal carbonate catalyst in methanol at an initial pressure of about ten pounds, was added a solution of 500 milligrams (13.21 millimoles based on pure reagent) of sodium borohydride (assay 83.5 percent) in five milliliters of water and the mixture was heated under reflux for one hour. After cooling slightly, a solution of three grams of sodium hydroxide in ten milliliters of water was added and the mixture was again heated to boiling in order to remove the methanol. After forty minutes all of the methanol had distilled, and the product, which had separated from solution, was collected by filtration, washed with water and dried under reduced pressure. The yield of crude pregnane-3α,11α,20-triol melting at 181–194 degrees centigrade was 3.705 grams. Recrystallization from ethyl acetate raised the melting point to 193–200 degrees centigrade with a recovery of sixty percent in the first crop. Further recrystallizations gave pregnane-3α,11α,20-triol melting at 205.5–206.5 degrees centigrade.

Anal.—Calcd. for $C_{21}H_{36}O_3$: C, 74.95; H, 10.78. Found: C, 74.75; H, 10.90.

Although the foregoing specification comprises preferred embodiments of the invention, it is to be understood that the invention is not limited to the exact details shown and described, and that variations and modifications can be made without departing from the scope of the invention as defined in the appended claims.

We claim:

1. A method for the conversion of a 3,20-diketopregnane to a 3-hydroxy-20-ketopregnane comprising contacting in solution a 3,20-diketopregnane with about 1–4 equivalents of a metal borohydride at temperatures from about zero degrees centigrade to about 100 degrees centigrade for a period of about two minutes to about two hours, the temperature and duration of the reaction varying inversely with the number of equivalents of metal borohydride, whereby the 3-keto group is selectively reduced to a hydroxyl group, and isolating a 3-hydroxy-20-ketopregnane from the reaction mixture.

2. The method of claim 1, wherein the selective reduction is conducted in solution in a solvent selected from the group consisting of an alkanol, dioxane and tetrahydrofuran.

3. A method for the conversion of a 3,20-diketopregnane to a 3-hydroxy-20-ketopregnane comprising contacting in solution a 3,20-diketopregnane with about 1–1.25 equivalents of sodium borohydride whereby the 3-keto group is selectively reduced to a hydroxyl group, and isolating a 3-hydroxy-20-ketopregnane from the reaction mixture.

4. A method for the conversion of a 3,20-diketo-pregnane having the formula:

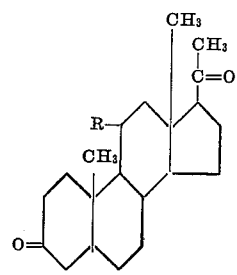

wherein R is a member of the group consiting of hydrogen, hydroxyl, acyloxy and carbonyl to a 3-hydroxy-20-ketopregnane having the formula:

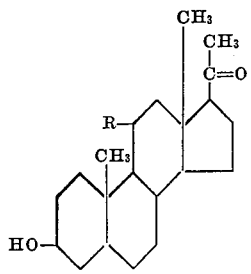

wherein R has the above designated values, comprising contacting in solution a 3,20-diketopregnane with about 1-1.25 equivalents of sodium borohydride whereby the 3-keto group is selectively reduced to a hydroxyl group, and isolating a 3-hydroxy-20-ketopregnane from the reaction mixture.

5. The method of claim 4, wherein the selective reduction is conducted in solution in a solvent selected from the group consisting of an alkanol, dioxane and tetrahydrofuran.

6. A method for the conversion of a 3,20-diketo-11-hydroxypregnane to a 3,11-dihydroxy-20-ketopregnane comprising contacting in solution a 3,20-diketo-11-hydroxypregnane with about 1-1.25 equivalents of sodium borohydride whereby the 3-keto group is selectively reduced to a hydroxyl group, and isolating a 3,11-dihydroxy-20-ketopregnane from the reaction mixture.

7. The method of claim 6, wherein the starting steroid is pregnane-11α-ol-3,20-dione.

8. The method of claim 6, wherein the starting steroid is allo-pregnane-11α-ol-3,20-dione.

9. A method for the conversion of a 3,20-diketo-11-acetoxypregnane to a 3-hydroxy-11-acetoxy-20-ketopregnane comprising contacting in solution a 3,20-diketo-11-acetoxypregnane with about 1-1.25 equivalents of sodium borohydride whereby the 3-keto group is selectively reduced to a hydroxyl group, and isolating a 3-hydroxy-11-acetoxy-20-ketopregnane from the reaction mixture.

10. The method of claim 9, wherein the starting steroid is 11α-acetoxypregnane-3,20-dione.

11. A method for the conversion of a 3,11,20-triketopregnane to a 3-hydroxy-11,20-diketopregnane comprising contacting in solution a 3,11-20-triketopregnane with about 1-1.25 equivalents of sodium borohydride whereby the 3-keto group is selectively reduced to a hydroxyl group, and isolating a 3-hydroxy-11,20-diketopregnane from the reaction mixture.

12. The method of claim 11, wherein the starting steroid is pregnane-3,11,20-trione.

13. A method for the conversion of a 3,11,20-triketopregnane to a 3-hydroxy-11,20-diketopregnane comprising contacting in solution a 3,11,20-triketopregnane with about 1-1.25 equivalents of lithium borohydride whereby the 3-keto group is selectively reduced to a hydroxyl group, and isolating a 3-hydroxy-11,20-diketopregnane from the reaction mixture.

14. A method for the conversion of a 3,20-diketo-11-acyloxypregnane, wherein the acyloxy group is of the formula AcO—, Ac being the radical of an organic carboxylic acid containing up to eight carbon atoms, inclusive, to a 3-hydroxy - 11 - acyloxy - 20 - ketopregnane comprising contacting in solution a 3,20-diketo-11-acyloxypregnane with about 1-1.25 equivalents of a metal borohydride whereby the 3-keto group is selectively reduced to a hydroxyl group, and isolating a 3-hydroxy-11-acyloxy-20-ketopregnane from the reaction mixture.

JOHN A. HOGG.
DOUGLAS A. LYTTLE.
ALAN H. NATHAN.

References Cited in the file of this patent

FOREIGN PATENTS

| Number | Country | Date |
|---|---|---|
| 594,878 | Great Britain | Nov. 21, 1947 |

OTHER REFERENCES

Long et al.: Jour. Biol. Chem. 165, 197–209 (1946).

Chaikin et al.: Jour. Am. Chem. Soc. 71, 122–125 (1949).

Ott et al.: Abst. of the 113th Meeting of Am. Chem. Soc., page 17K (1948).